United States Patent
Suzuki et al.

(10) Patent No.: US 8,306,698 B2
(45) Date of Patent: Nov. 6, 2012

(54) STEERING DEVICE

(75) Inventors: Yoshiaki Suzuki, Toyota (JP); Shuji Fujita, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 540 days.

(21) Appl. No.: 12/522,603

(22) PCT Filed: Dec. 28, 2007

(86) PCT No.: PCT/JP2007/075424
§ 371 (c)(1),
(2), (4) Date: Jul. 9, 2009

(87) PCT Pub. No.: WO2008/084755
PCT Pub. Date: Jul. 17, 2008

(65) Prior Publication Data
US 2010/0121530 A1 May 13, 2010

(30) Foreign Application Priority Data
Jan. 10, 2007 (JP) .................................. 2007-001912

(51) Int. Cl.
*A01B 69/00* (2006.01)
(52) U.S. Cl. ................ 701/41; 701/42; 701/43; 701/36; 701/22; 180/402; 180/405; 180/407; 180/446; 180/65.1
(58) Field of Classification Search .................... 701/41, 701/42, 43; 180/405, 402, 407, 400, 446, 180/65.1
See application file for complete search history.

(56) References Cited

U.S. PATENT DOCUMENTS

| 6,301,528 | B1 | 10/2001 | Bertram et al. |
| 6,502,024 | B2 * | 12/2002 | Ishihara et al. .................. 701/41 |
| 7,520,352 | B2 * | 4/2009 | Hoshiba et al. ............ 180/65.29 |
| 7,526,372 | B2 * | 4/2009 | Tsutsumi et al. ............... 701/43 |
| 2002/0033301 | A1 * | 3/2002 | Clephas ........................ 180/446 |

(Continued)

FOREIGN PATENT DOCUMENTS

DE 198 57 916 A1 6/2000

(Continued)

OTHER PUBLICATIONS

Office Action issued Sep. 2, 2010, in German Patent Application No. 11 2007 003 256.1-21.

*Primary Examiner* — Redhwan K Mawari
(74) *Attorney, Agent, or Firm* — Oblon, Spivak, McClelland, Maier & Neustadt, L.L.P.

(57) ABSTRACT

When the magnitude $|\omega|$ of a steering angular velocity $\omega$ is equal to or greater than a determination angular velocity $\omega th$, an electric motor is estimated to be in a predetermined power use state, and a restriction determination threshold Vonth is set to a first voltage value V1. When the magnitude $|\omega|$ of the steering angular velocity $\omega$ is less than the determination angular velocity $\omega th$, the restriction determination threshold Vonth is set to a second voltage value V2 (>V1). When a state in which a power supply voltage Vx is lower than the restriction determination threshold Vonth continues for a predetermined time t1, a power use restriction instruction is output to specific vehicle electrical loads. Thus, power restriction is properly imposed on the vehicle electrical loads, whereby a delay in control of the electric motor is prevented, and excessive imposition of power restriction is prevented.

7 Claims, 7 Drawing Sheets

U.S. PATENT DOCUMENTS

| | | | |
|---|---|---|---|
| 2007/0043490 A1* | 2/2007 | Yokota et al. | 701/41 |
| 2010/0121530 A1* | 5/2010 | Suzuki et al. | 701/41 |

FOREIGN PATENT DOCUMENTS

| | | |
|---|---|---|
| DE | 10 2004 038 741 A1 | 2/2006 |
| DE | 10 2004 061 832 A1 | 7/2006 |
| EP | 1 544 698 A1 | 6/2005 |
| JP | 61 172866 | 10/1986 |
| JP | 63 43865 | 2/1988 |
| JP | 63 64869 | 3/1988 |
| JP | 63 255172 | 10/1988 |
| JP | 1 248990 | 10/1989 |
| JP | 6 191418 | 7/1994 |
| WO | WO 2006/022125 A1 | 3/2006 |

\* cited by examiner

STEERING DEVICE

TECHNICAL FIELD

The present invention relates to a steering apparatus, such as an electric power steering apparatus, which provides steering torque while controlling the amount of electricity supplied to an electric motor in accordance with a steering state of a steering wheel.

BACKGROUND ART

Conventionally, an electric power steering apparatus has been known as a steering apparatus of such a type. The electric power steering apparatus is designed to provide steering assist torque while controlling the amount of electricity supplied to an electric motor in accordance with a steering state of a steering wheel. However, such an electric power steering apparatus consumes a considerable amount of electrical power. Therefore, when the performance of a battery, which is a power source mounted on a vehicle, drops, supply of electric power to the electric motor becomes insufficient or power supply voltage temporarily drops when the electric motor operates, whereby the electric power steering apparatus fails to provide a designed performance. In order to overcome such a problem, in an electric power steering apparatus disclosed in Japanese Patent Application Laid-Open (kokai) No. S63-64869, upon detection of a situation in which a large amount of electric power must be supplied to an electric motor, supply of electricity to other electric devices (electrical loads mounted on a vehicle (hereinafter referred to as "vehicle electrical loads")) is temporarily stopped, whereby imposition of an excessively large load on a battery is prevented. Specifically, when the rotational speed of an engine becomes equal to or less than a predetermined level and a change rate of the steering angle of a steering wheel becomes equal to or greater than a predetermined level, supply of electricity to other electric devices is stopped.

DISCLOSURE OF THE INVENTION

Incidentally, in a situation where the performance of the battery has not yet dropped, restricting the supply of electric power to other electric devices as described above is not preferred. In view of this, there has been conceived a power supply management system which always monitors the power supply voltage of a power supply apparatus including a battery, and restricts the supply of electric power to a specific electric device(s) when the power supply voltage becomes lower than a predetermined voltage (restriction determination threshold). However, even when such a power supply management system is used, in some cases electric power restriction cannot be performed properly.

For example, since a lowest power supply voltage which an electric power steering apparatus requires to provide its performance is known in advance, the lowest power supply voltage may be set as a restriction determination threshold which is used to determine whether or not electric power restriction is imposed. Here, there will be considered an electric power steering apparatus which supplies electric power to an electric motor from a 12 V power supply apparatus so as to assist steering operation. When the power supply voltage needed to maintain the assist performance of the electric power steering apparatus is 9 V, the restriction determination threshold is set to 9 V. Accordingly, when the power supply voltage is lower than 9 V, the supply of electric power to other vehicle electrical loads is restricted. However, when the restriction determination threshold is set in the above-described manner, in some cases a delay may be produced in steering assist (generation of assist torque) by the electric power steering apparatus.

That is, in an electric power steering apparatus, an electric motor is driven so as to perform steering assist. Thus, at the time of steering assist, a large amount of current is withdrawn from a power supply apparatus (in particular, a battery), whereby the power supply voltage drops temporarily. Accordingly, even in a case where the power supply voltage is greater than the restriction determination threshold in a period during which steering assist is not performed, in some cases, the power supply voltage drops below the restriction determination threshold when steering assist is performed. When the power supply management system detects that the power supply voltage has dropped below the restriction determination threshold, the system starts to restrict the supply of electric power to other vehicle electrical loads. However, starting the electric power restriction at this point results in a failure to supply a sufficient amount of electric power to the electric motor for which a drive instruction has already been issued. That is, a sufficient amount of current cannot be instantaneously withdrawn from the power supply apparatus at the time when steering assist is started, and as a result a control delay is produced.

FIG. 8 shows changes in power supply voltage attributable to steering assist. In a case where the performance of a battery has not yet dropped, the power supply voltage assumes a value near its rated voltage (12 V). However, when the performance of the battery deteriorates, the power supply voltage drops. Case A of FIG. 8 shows a change in power supply voltage when steering assist is performed by use of a battery whose performance has dropped. In this case A, when steering assist is performed, the power supply voltage drops from 10 V to 8.5 V, which is lower than a power supply voltage (9 V) needed to maintain the performance of the electric power steering apparatus. At that time, upon detection of the power supply voltage falling below 9 V, the power supply management system starts to restrict the supply of electric power to other vehicle electrical loads. In this case, as described above, a delay occurs in the steering assist control.

In a case where, in order to solve such a problem, the restriction determination threshold is set to 10.5 V (9 V+1.5 V) in consideration of a voltage drop (1.5 V) attributable to steering assist, the above-described delay in steering assist control can be prevented. However, in this case, there arises another problem in that restriction on the supply of electric power to other vehicle electrical loads is performed excessively.

For example, in a case where the power supply voltage drops from 11 V to 9.5 V at the time of steering assist as shown in Case B of FIG. 8, the supply of electric power to other vehicle electrical loads is restricted when the power supply voltage falls below the restriction determination threshold (10.5 V), despite the power supply apparatus having a power supply performance for providing a desired steering assist performance. Therefore, other vehicle electrical loads cannot be used effectively, and a driver is requested to replace the battery at an excessive frequency.

An object of the present invention is to cope with the above-described problem, and to properly restrict the supply of electric power to vehicle electrical loads to thereby prevent delay in control of an electric motor, and to prevent excessive restriction on the supply of electric power to vehicle electrical loads.

In order to achieve the above-described object, the present invention provides a steering apparatus comprising an electric motor to which electric power is supplied from a power supply apparatus and which generates a steering torque; motor control means for controlling an amount of electricity supplied to the electric motor in accordance with an operation state of a steering wheel; voltage detection means for detecting a power supply voltage of the power supply apparatus; restriction instruction means for determining whether or not the voltage detected by the voltage detection means is lower than a restriction determination threshold and for issuing a restriction instruction, when the detected voltage is lower than the restriction determination threshold, so as to restrict use of electric power by a specific vehicle electrical load which receives electric power from the power supply apparatus; and determination threshold switching means for switching the restriction determination threshold in accordance with a state of use of electric power by the electric motor in such a manner that a value of the restriction determination threshold used when the electric motor is determined not to use a predetermined amount of electric power or more is set to be higher than a value of the restriction determination threshold used when the electric motor is determined to use the predetermined amount of electric power or more.

According to this invention, the voltage detection means detects the power supply voltage of the power supply apparatus; and, when the detected voltage is lower than the restriction determination threshold, the restriction instruction means outputs a restriction instruction for restricting the use of electric power by the specific vehicle electrical load. The determination threshold switching means switches the restriction determination threshold in accordance with the state of use of electric power by the electric motor. The determination threshold switching means switches the restriction determination threshold in such a manner that the value of the restriction determination threshold used when the electric motor is determined not to use a predetermined amount of electric power or more is set to be higher than the value of the restriction determination threshold used when the electric motor is determined to use the predetermined amount of electric power or more.

The power supply voltage of the power supply apparatus temporarily drops when the electric motor is driven. Therefore, under the assumption that, when the electric motor consumes a predetermined amount of electric power or more, a predetermined voltage drop is produced in the power supply voltage, the restriction determination threshold is changed in accordance with this power consumption state. That is, the value of the restriction determination threshold used when the electric motor is not driven is set to be higher than the value of the restriction determination threshold used when the electric motor is driven (when the electric motor uses a predetermined amount of electric power or more), in consideration of a voltage drop at the time when the motor is driven. Accordingly, even when a certain voltage drop is produced as a result of driving of the electric motor, it is possible to prevent occurrence of a phenomenon that the power supply voltage drops, for the first time, blow the restriction determination threshold at that time. That is, even in a state where electric motor is not driven, when the capacity of the power supply apparatus has lowered to such a level that the power supply apparatus is estimated to fail to properly drive the electric motor, from that point in time, power use restriction can be imposed on the specific vehicle electrical load. As a result, control delay at the time of start of drive control of the electric motor can be suppressed.

Meanwhile, during periods in which the electric motor is driven, the restriction determination threshold is set to a lower value as compared with that used in periods in which the electric motor is not driven. This setting prevents excessive imposition of power use restriction on the specific vehicle electrical loads. Further, this setting prevents a driver from being requested to replace the battery at a frequency higher than necessary.

Notably, the "predetermined amount of electric power" used to determine the state of use of electric power by the electric motor is a predetermined magnitude of electric power greater than zero, and may be close to zero.

Further, in the present invention, the term "steering torque" refers to torque required for steering control, such as steering assist torque acting in a direction for assisting steering operation of the steering wheel, steering reaction torque acting in a direction for preventing the steering operation of the steering wheel, and steering torque for steering steerable wheels without use of a driver's steering operation force. Accordingly, the steering apparatus of the present invention can be applied to electric power steering apparatuses, steering-by-wire-type steering apparatuses, etc.

Further, the motor control means includes at least one of steering torque detection means for detecting a steering torque applied to the steering wheel, a steering angle detection means for detecting a steering angle of the steering wheel, and a steering angular velocity detection means for detecting a steering angular velocity of the steering wheel; and controls the amount of electricity supplied to the electric motor in accordance with the operation state detected by the at least one detection means.

Another feature of the present invention resides in provision of steering angular velocity detection means for detecting a steering angular velocity of the steering wheel, wherein the determination threshold switching means estimates the state of use of electric power by the electric motor on the basis of the detected steering angular velocity, and switches the restriction determination threshold in such a manner that a value of the restriction determination threshold used when the steering angular velocity is less than a predetermined angular velocity is set to be higher than a value of the restriction determination threshold used when the steering angular velocity is equal to or greater than the predetermined angular velocity.

In this invention, the state of use of electric power by the electric motor is estimated on the basis of the steering angular velocity detected by the steering angular velocity detection means. That is, when the steering angular velocity is equal to or greater than the predetermined angular velocity, the electric motor is estimated to use the predetermined amount of electric power or more; and, when the steering angular velocity is less than the predetermined angular velocity, the electric motor is estimated not to use the predetermined amount of electric power or more. For example, in the case of an electric power steering apparatus, when a driver operates the steering wheel, the electric motor is driven and controlled so as to assist the driver's operation. Therefore, the state of use of electric power by the electric motor can be estimated from the steering angular velocity of the steering wheel. In view of this, the determination threshold switching means switches the restriction determination threshold in such a manner that the value of the restriction determination threshold used when the steering angular velocity is less than the predetermined angular velocity is set to be higher than the value of the restriction determination threshold used when the steering angular velocity is equal to or greater than the predetermined angular velocity. In general, in a steering apparatus designed to control the amount of electricity supplied to the electric motor in accordance with the operation state of the steering wheel, steering angular velocity detection means is provided. Therefore, this means can be effectively used for estimation of the state of use of electric power by the electric motor. Notably, the term "steering angular velocity" used herein refers to the magnitude of the steering angular velocity, and does not specify the direction of steering.

Another feature of the present invention resides in provision of steering torque detection means for detecting a steering torque applied to the steering wheel, wherein the determination threshold switching means estimates the state of use of electric power by the electric motor on the basis of the detected steering torque, and switches the restriction determination threshold in such a manner that a value of the restriction determination threshold used when the steering torque is less than a predetermined torque is set to be higher than a value of the restriction determination threshold used when the steering torque is equal to or greater than the predetermined torque.

In this invention, the state of use of electric power by the electric motor is estimated on the basis of the steering torque detected by the steering torque detection means. That is, when the steering torque is equal to or greater than the predetermined torque, the electric motor is estimated to use the predetermined amount of electric power or more; and, when the steering torque is less than the predetermined torque, the electric motor is estimated not to use the predetermined amount of electric power or more. For example, in the case of an electric power steering apparatus, when a driver operates the steering wheel, the electric motor is driven and controlled so as to assist the driver's operation. Therefore, the state of use of electric power by the electric motor can be estimated from the steering torque acting on the steering wheel. In view of this, the determination threshold switching means switches the restriction determination threshold in such a manner that the value of the restriction determination threshold used when the steering torque is less than the predetermined torque is set to be higher than the value of the restriction determination threshold used when the steering torque is equal to or greater than the predetermined torque. In general, in a steering apparatus designed to control the amount of electricity supplied to the electric motor in accordance with the operation state of the steering wheel, steering torque detection means is provided. Therefore, this means can be effectively used for estimation of the state of use of electric power by the electric motor. Notably, the term "steering torque" refers to the magnitude of the steering torque, and does not specify the direction of steering.

Another feature of the present invention resides in provision of motor current detection means for detecting a current flowing through the electric motor, wherein the determination threshold switching means estimates the state of use of electric power by the electric motor on the basis of the detected motor current, and switches the restriction determination threshold in such a manner that a value of the restriction determination threshold used when the motor current is less than a predetermined current is set to be higher than a value of the restriction determination threshold used when the motor current is equal to or greater than the predetermined current.

In this invention, the state of use of electric power by the electric motor is estimated on the basis of the motor current detected by the motor current detection means. That is, when the motor current is equal to or greater than the predetermined current, the electric motor is estimated to use the predetermined amount of electric power or more; and, when the motor current is less than the predetermined current, the electric motor is estimated not to use the predetermined amount of electric power or more. In view of this, the determination threshold switching means switches the restriction determination threshold in such a manner that the value of the restriction determination threshold used when the motor current is less than the predetermined current is set to be higher than the value of the restriction determination threshold used when the motor current is equal to or greater than the predetermined current. In general, in a steering apparatus designed to generate a steering torque while controlling the amount of electricity supplied to the electric motor, motor current detection means is provided. Therefore, this means can be effectively used for estimation of the state of use of electric power by the electric motor. Notably, the term "motor current" refers to the magnitude of the motor current, and does not specify the electricity supply direction.

Another feature of the present invention resides in provision of restriction cancellation means for canceling the restriction on use of electric power when the power supply voltage detected by the voltage detection means becomes higher than a preset cancellation determination threshold in a state where the restriction instruction means is outputting the restriction instruction, wherein the cancellation determination threshold is higher than the restriction determination threshold.

According to this present invention, when the power supply voltage increases and becomes higher than the cancellation determination threshold in a state where the power supply voltage had dropped below the restriction determination threshold and the restriction instruction is output, the restriction cancellation means cancels the restriction on use of electric power. This cancellation determination threshold is set to be higher than the restriction determination threshold. Accordingly, there does not occur frequent switching between the state where power use restriction is imposed and the state where power use restriction is not imposed, which frequent switching would otherwise occur as a result of the power supply voltage frequently changing across the restriction determination threshold. Therefore, stable power use restriction control can be performed. Moreover, since the operation state of the specific vehicle electrical load is not switched at an excessive frequency, the specific vehicle electrical load can be protected.

Another feature of the present invention resides in that the restriction instruction means outputs the restriction instruction when a state in which the voltage detected by the voltage detection means is lower than the restriction determination threshold continues for a restriction determination time or more; and the restriction cancellation means cancels the restriction on use of electric power when a state in which the voltage detected by the voltage detection means is higher than the cancellation determination threshold continues for a cancellation determination time or more, wherein the cancellation determination time is longer than the restriction determination time.

According to this invention, the restriction instruction for restricting use of electric power is issued when the power supply voltage has dropped below the restriction determination threshold, and the restriction on use of electric power is cancelled when the power supply voltage has exceeded the cancellation determination threshold. However, each of the issuing of the restriction instruction and the cancellation of the restriction is performed only when the corresponding voltage condition continues for a predetermined determination time or more. Accordingly, for an instantaneous change in the power supply voltage, the state of power use restriction is not switched, whereby stable power restriction control can be performed. In addition, the cancellation determination time, which is the condition associated with continuity so as to cancel power use restriction, is set to be longer than the restriction determination time, which is the condition associated with continuity so as to start power use restriction. Therefore, stability and responsiveness of power restriction control can be realized simultaneously. That is, the determination for starting power use restriction is performed within a short period of time so as to enhance responsiveness; and the determination for cancelling power use restriction is performed while using a longer time so as to enhance stability, because the determination for cancelling power use restriction does not require high responsiveness.

BEST MODE FOR CARRYING OUT THE INVENTION

Figure 1:
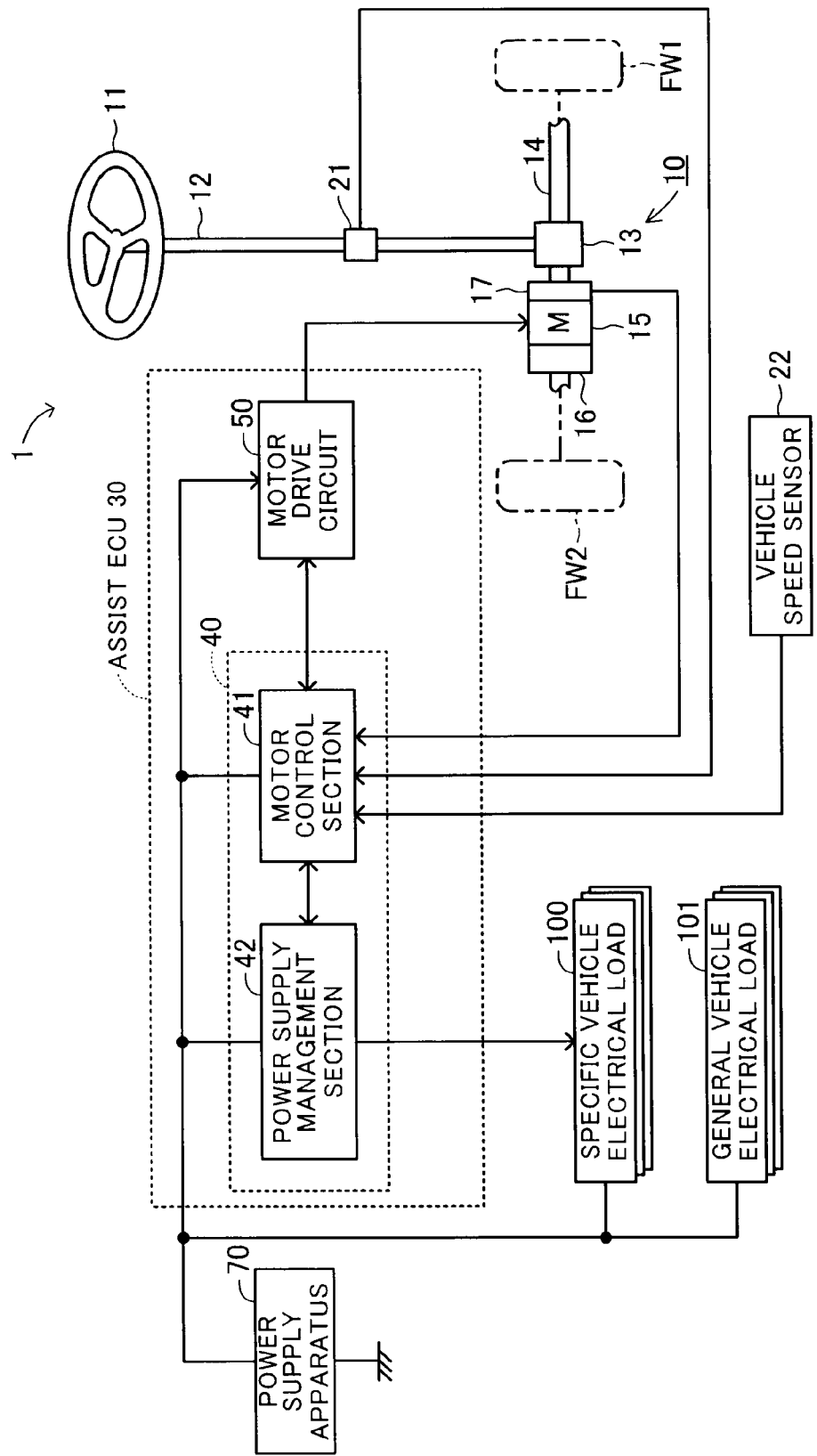
FIG. 1 is an overall diagram of an electric power steering apparatus according to an embodiment of the present invention.
Figure 2:
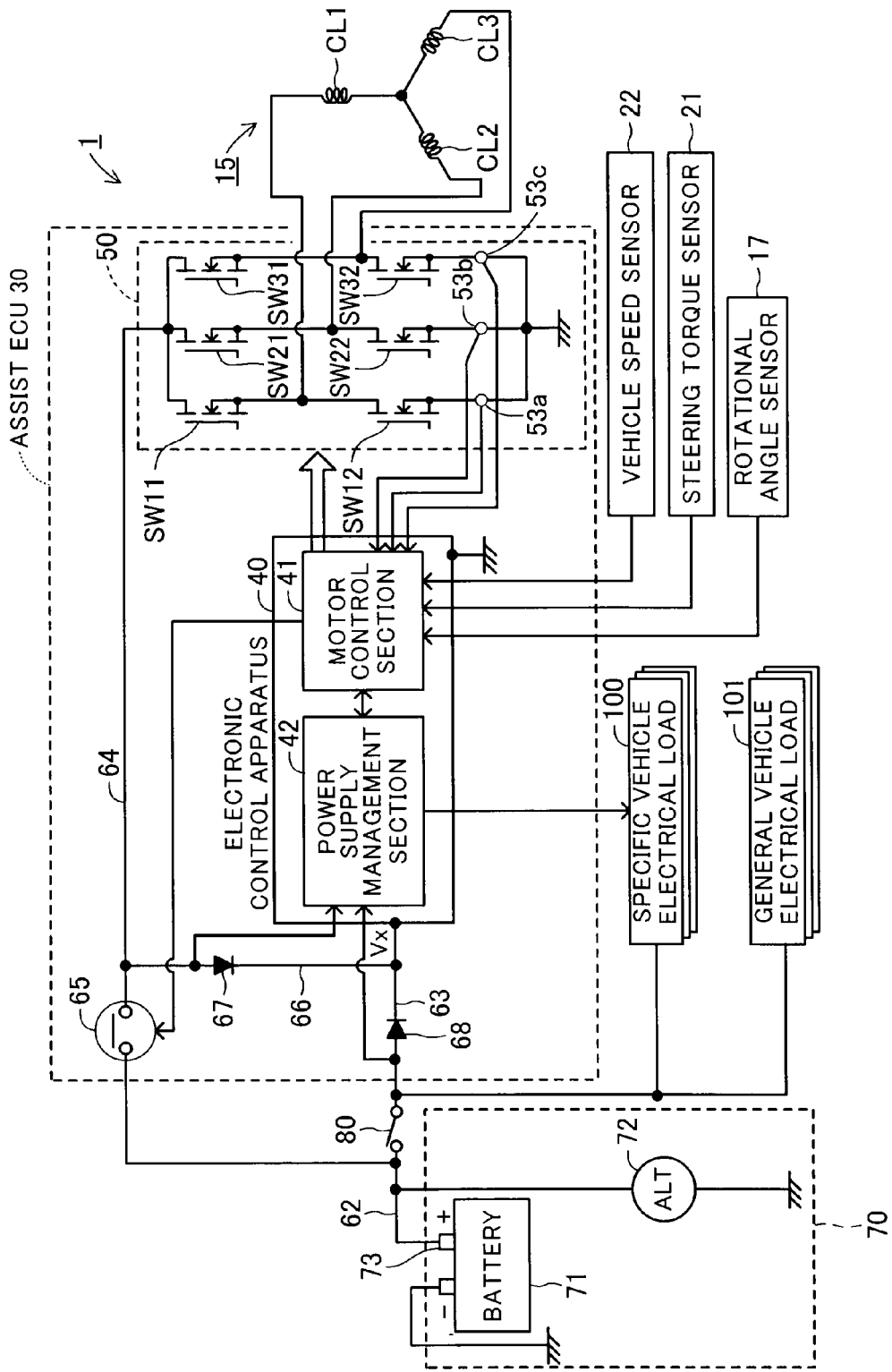
FIG. 2 is a schematic circuit diagram showing a control system and a power supply system of the electric power steering apparatus of the embodiment.

Below, an embodiment of the invention will be described with reference to the drawings. FIG. 1 schematically shows an electric power steering apparatus for a vehicle, which is an embodiment of a steering apparatus of the present invention. FIG. 2 schematically shows a control system and a power supply system of the electric power steering apparatus.

This electric power steering apparatus 1 for a vehicle is mainly composed of a steering mechanism 10 which steers steerable wheels in accordance with steering operation of a steering wheel 11; an electric motor 15 incorporated in the steering mechanism 10 and adapted to generate steering assist torque; and an assist electronic control unit 30 which controls operation of the electric motor 15 in accordance with the steering state of the steering wheel 11.

The steering mechanism 10, which steers left and right front wheels FW1 and FW2 in response to a rotation operation of the steering wheel 11, includes a steering shaft 12 whose upper end is connected to the steering wheel 11 for integral rotation therewith. A pinion gear 13 is connected to the lower end of the shaft 12 for integral rotation therewith. The pinion gear 13 is in meshing engagement with rack teeth formed on a rack bar 14, and constitutes a rack and pinion mechanism in cooperation with the rack bar 14. The left and right front wheels FW1 and FW2 are steerably connected to opposite ends of the rack bar 14 via unillustrated tie rods and knuckle arms. The left and right front wheels FW1 and FW2 are steered leftward or rightward in accordance with an axial displacement of the rack bar 14 resulting from rotation of the steering shaft 12 about its axis. Accordingly, the steering mechanism 10 is constituted by the steering wheel 11, the steering shaft 12, the rack and pinion mechanism 13, 14, the tie rods, the knuckle arms, etc.

An electric motor 15 for steering assist is assembled to the rack bar 14. In the present embodiment, a brushless three-phase permanent magnet motor is used for the electric motor 15. A rotary shaft of the electric motor 15 is connected to the rack bar 14 via a ball-screw mechanism 16 in a power transmissible manner. Rotation of the rotary shaft of the electric motor 15 assists steering of the left and right front wheels FW1 and FW2. The ball-screw mechanism 16 serves as a speed reducer and a rotation-rectilinear motion converter. The ball-screw mechanism 16 reduces the rotational speed of the electric motor 15, converts rotation of the electric motor 15 to a rectilinear motion, and transmits the rectilinear motion to the rack bar 14. Instead of assembling the electric motor 15 to the rack bar 14, the electric motor 15 may be assembled to the steering shaft 12. In this case, rotation of the electric motor 15 is transmitted to the steering shaft 12 via a speed reducer so as to rotate the shaft 12 about its axis.

A steering torque sensor 21 is provided on the steering shaft 12. The steering torque sensor 21 outputs a signal corresponding to a steering torque which acts on the steering shaft 12 as a result of the steering wheel 11 being rotated. Hereinafter, the value of steering torque detected on the basis of the signal output from the steering torque sensor 21 will be referred to as "steering torque Th." The direction in which the steering wheel 11 is rotated is determined on the basis of the polarity of the steering torque Th; i.e., whether the steering torque Th is positive or negative. In the present embodiment, the steering torque Th assumes a positive value when the steering wheel 11 is rotated clockwise, and assumes a negative value when the steering wheel 11 is rotated counterclockwise. Accordingly, the magnitude of the steering torque Th is the magnitude of the absolute value thereof.

A rotational angle sensor 17 is provided for the electric motor 15. This rotational angle sensor 17 is incorporated into the electric motor 15, and outputs a detection signal corresponding to the rotational angle position of the rotor of the electric motor 15. The detection signal output from the rotational angle sensor 17 is used for calculation of rotational angle and rotational angular velocity of the electric motor 15. Meanwhile, since the rotational angle of the electric motor 15 is in proportion to the steering angle of the steering wheel 11, the rotational angle of the electric motor 15 is also used as the steering angle of the steering wheel 11. Further, since a rotational angular velocity, which is obtained by differentiating the rotational angle of the electric motor 15 with respect to time, is in proportion to the steering angular velocity of the steering wheel 11, the rotational angular velocity of the electric motor 15 is also used as the steering angular velocity of the steering wheel 11.

Hereinbelow, a value of steering angle of the steering wheel 11 detected on the basis of the output signal from the rotational angle sensor 17 will be referred to as "steering angle θ," and a value of rotational angular velocity obtained by differentiating the steering angle θ with respect to time will be referred to as "steering angular velocity ω. Notably, the steering angle θ and the steering angular velocity ω are calculated by a motor control section 41 within an electronic control apparatus 40 to be described later.

Positive and negative values of the steering angle θ represent clockwise and counterclockwise steering angles, respectively, of the steering wheel 11 in relation to its neutral position. In the present embodiment, the neutral position of the steering wheel 11 is represented by "0," a clockwise steering angle in relation to the neutral position is represented by a positive value, and a counterclockwise steering angle in relation to the neutral position is represented by a negative value.

The assist electronic control unit 30 (hereinafter referred to as the "assist ECU 30") includes the electronic control apparatus 40 and a motor drive circuit 50. The electronic control apparatus 40 is mainly formed of a microcomputer including a CPU, ROM, RAM, etc., and includes an input/output interface. The motor drive circuit 50 drives and controls the electric motor 15 in accordance with a control signal from the electronic control apparatus 40. Further, the electronic control apparatus 40 is functionally divided into a motor control section 41 and a power supply management section 42.

The motor control section 41 receives detection signals output from the rotational angle sensor 17, the steering torque sensor 21, and a vehicle speed sensor 22 for detecting traveling speed v of the vehicle; determines a target current to be supplied to the electric motor 15 on the basis of the detection signals; and controls the motor drive circuit 50 on the basis of a deviation between the target current and the motor actual current detected by a current sensor 53, to thereby generate a predetermined steering assist torque. Assist control processing executed by this motor control section 41 will be described later.

The power supply management section 42 monitors power supply voltage (power supply voltage supplied to the electric power steering apparatus 1). When the power supply voltage becomes lower than a predetermined determination threshold, the power supply management section 42 issues a power use restriction instruction to control apparatuses of specific vehicle electrical loads 100. Power use restriction processing executed by this power supply management section 42 will also be described later.

As shown in FIG. 2, the motor drive circuit 50 constitutes a three-phase inverter circuit, and includes switching elements SW11, SW12, SW21, SW22, SW31, and SW32, which correspond to individual coils CL1, CL2, and CL3 of the electric motor 15. In the present embodiment, each of the switching elements SW11, SW12, SW21, SW22, SW31, and SW32 is formed of a MOSFET, and is turned on and off in accordance with a signal from the motor control section 41. Further, the motor drive circuit 50 includes current sensors 53a, 53b, and 53c provided for the respective phases so as to detect currents flowing through the electric motor 15. Herein, these three current sensors 53a, 53b, and 53c will be collectively referred to as a "current sensor 53." Notably, each of the switching elements SW11, SW12, SW21, SW22, SW31, and SW32 formed of MOSFETs includes a parasitic diode, which is not shown in the drawing.

Next, the configuration of a power supply system for supplying electric power to the assist ECU 30 will be described with reference to FIG. 2. The assist ECU 30 receives electricity from a power supply apparatus 70 composed of a battery 71 and an alternator 72, which serves as a generator. An ordinary car battery whose rated output voltage is 12 V is used for the battery 71. An ignition switch 80 is connected to a power supply source line 62 connected to a power supply terminal (+ terminal) 73 of the battery 71. The assist ECU 30 includes a control power supply line 63 for supplying electric power to the electronic control apparatus 40 from the secondary side of the ignition switch 80, and a drive power supply line 64 for supplying electric power mainly to the motor drive circuit 50 from the primary side (power source side) of the ignition switch 80.

A diode 68 is provided in the control power supply line 63. This diode 68 is provided in such an orientation that its cathode is connected to the electronic control apparatus 40 and its anode is connected to the power supply apparatus 70. The diode 68 serves as a reverse flow prevention element which allows only a flow of electricity in the power supply direction. A power supply relay 65 is provided in the drive power supply line 64. In response to a control signal from the electronic control apparatus 40, the power supply relay 65 turns on, to thereby form a circuit for supplying electric power to the electric motor 15.

On the load side of the power supply relay 65, the drive power supply line 64 is connected to the control power supply line 63 via a connection line 66. This connection line 66 is connected to the control power supply line 63 at a point between the diode 68 and the electronic control apparatus 40. A diode 67 is disposed in the connection line 66. This diode 67 is provided in such an orientation that its cathode is connected to the control power supply line 63, and its anode is connected to the drive power supply line 64. The diode 67 serves as a reverse flow prevention element which allows only a flow of electricity from the drive power supply line 64 toward the control power supply line 63. In the power supply system configured as described above, when the power supply relay 65 is turned on, electric power is supplied to the electronic control apparatus 40 and the drive circuit 50 irrespective of the state of the ignition switch 80.

The power supply management section 42 detects voltage supplied to the assist ECU 30 at two points; i.e., the voltage on the drive power supply line 64 and the voltage on the control power supply line 63. Specifically, the power supply management section 42 includes an A/D converter for converting the primary side voltage of the diode 67 and the primary side voltage of the diode 68 to respective digital signals. The power supply management section 42 uses, as a power supply voltage Vx, a higher one of two monitor voltage values obtained from these two power supply voltage signals.

In addition to the electric power steering apparatus 1, a plurality of vehicle electrical loads are connected to the power supply apparatus 70. For example, connected to the power supply apparatus 70 are vehicle electrical loads which control traveling conditions of a vehicle, such as a suspension controller, a brake controller, and an engine controller, and vehicle electrical loads which are not directly related to traveling of the vehicle, such as an air conditioning controller, a seat heater apparatus, and a defogger apparatus (these vehicle electrical loads are not shown in the drawings).

When the power supply capacity of the power supply apparatus 70 has lowered, the power supply management section 42 issues a restriction instruction to the air conditioning controller, the seat heater apparatus, and the defogger apparatus, which are not directly related to traveling of the vehicle, to thereby restrict their use of electric power. For such a purpose, the power supply management section 42 is communicably connected to control apparatuses of such vehicle electrical loads. In the following description, the vehicle electrical loads communicably connected to the power supply management section 42 and whose power use is restricted will be referred to as the "specific vehicle electrical loads 100"; and vehicle electrical loads whose power use is not restricted will be referred to as the "general vehicle electrical loads 101."

Figure 3:
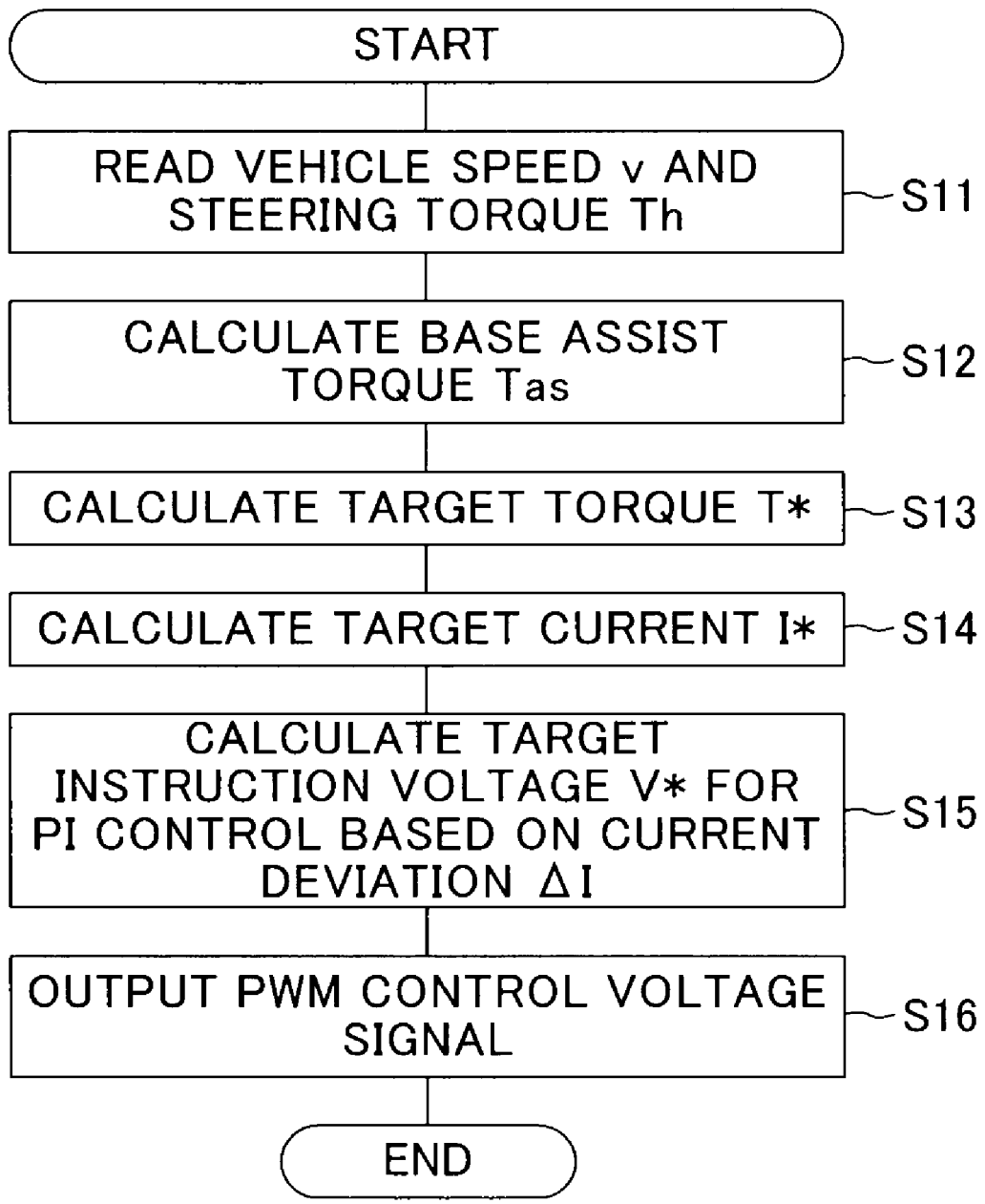
FIG. 3 is a flowchart showing an assist control routine.

Next, the assist control processing executed by the motor control section 41 of the electronic control apparatus 40 will be described. FIG. 3 shows an assist control routine which is stored in the ROM of the electronic control apparatus 40 as a control program and executed by the motor control section 41. The present control routine is started after completion of a predetermined initial diagnosis procedure performed when the ignition switch 80 is turned on, and is repeatedly executed at short intervals until the ignition switch 80 is turned off.

When the present routine is started, in step S11, the motor control section 41 first reads the vehicle speed v detected by the vehicle speed sensor 22 and the steering torque Th detected by the steering torque sensor 21.

Subsequently, with reference to an assist torque table shown in FIG. 4, the motor control section 41 calculates a base assist torque Tas set in accordance with the input vehicle speed v and steering torque Th (S12). The assist torque table is stored in the ROM of the electronic control apparatus 40, and is set such that the base assist torque Tas increases as the steering torque Th increases, and the lower the vehicle speed v, the greater the value of the base assist torque Tas.

Figure 4:
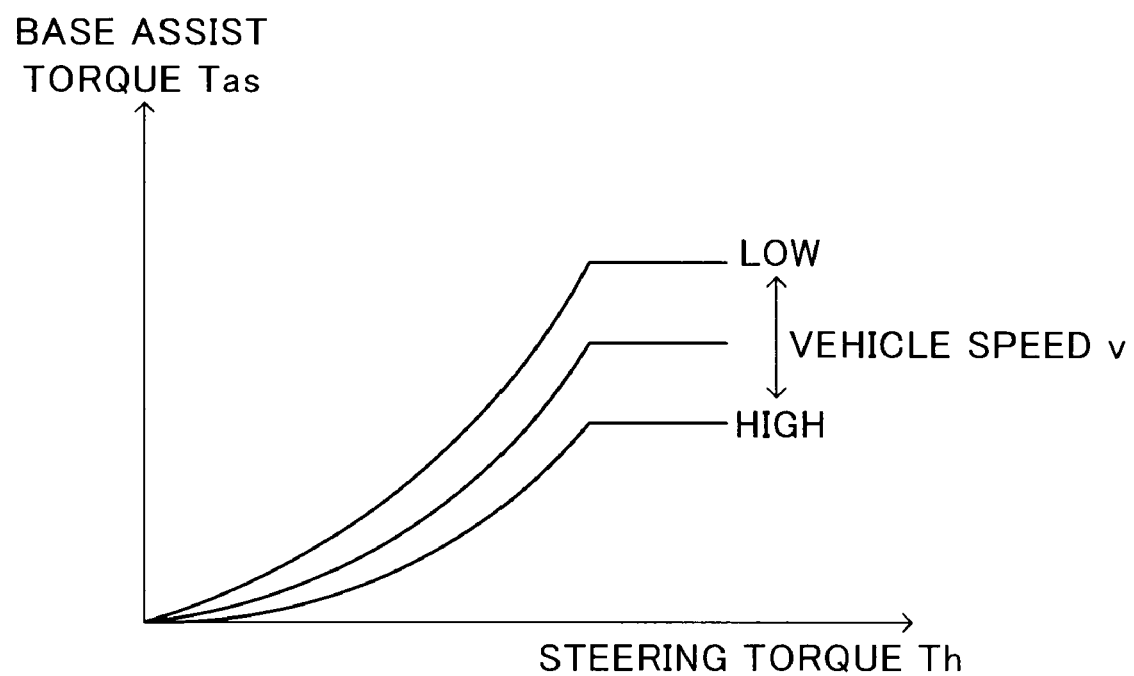
FIG. 4 is an explanatory view showing a table for calculating a base assist torque.

Notably, a characteristic graph of FIG. 4 shows only the relation between the base assist torque Tas and the steering torque Th in the positive region; i.e., in the clockwise direction. However, the relation between the base assist torque Tas and the steering torque Th in the negative region; i.e., in the counterclockwise direction, is in point symmetry with the above-mentioned relation, with respect to the origin of the characteristic graph of FIG. 4. Further, in the present embodiment, the base assist torque Tas is calculated by use of the assist torque table. However, the present embodiment may be modified as follows. In place of the assist torque table, a function which defines the base assist torque Tas that varies with the steering torque Th and the vehicle speed v is prepared, and the base assist torque Tas is calculated by use of the function.

Further, the base assist torque Tas is not necessarily required to be calculated from the combination of the vehicle speed v and the steering torque Th, and may be calculated at least on the basis of a detection signal representing the state of steering.

Subsequently, in step S13, the motor control section 41 calculates a target torque T* by adding a compensation torque Trt to the base assist torque Tas. Although this compensation torque Trt is not necessarily required, for example, it is calculated as the sum of a return force with which the steering shaft 12 is returned to its base position and which increases in proportion to the steering angle θ and a return torque which corresponds to a resisting force against rotation of the steering shaft 12 and which increases in proportion to the steering angular velocity ω. The motor control section 41 performs this calculation while using the rotational angle θ of the electric motor 15 detected by the rotational angle sensor 17 and the angular velocity ω of the electric motor 15 (corresponding to the steering angular velocity ω obtained through differentiation of the steering angle θ of the steering wheel 11 with respect to time).

Next, in step S14, the motor control section 41 calculates a target current I* which is required to generate the target torque T*. The target current I* is obtained by dividing the target torque T* by a torque constant.

Subsequently, the motor control section 41 proceeds to step S15 so as to calculate a deviation ΔI between the target current I* and actual current Ix, and calculate a target instruction voltage V* for PI control (proportional integral control) performed on the basis of the deviation ΔI. The actual current Ix used in the calculation in step S15 is the value of current flowing through the electric motor 15 and detected by the current sensor 53.

For example, the target instruction voltage V* is calculated by the following equation.

$$V^* = Kp \cdot \Delta I + Ki \cdot \int \Delta I dt$$

Here, Kp is a control gain of the proportional term in the PI control, and Ki is a control gain of the integral term in the PI control.

In step S16, the motor control section 41 outputs to the motor drive circuit 50 a PWM control voltage signal corresponding to the target instruction voltage V*, and ends the current execution of the present assist control routine. The present control routine is repeatedly executed at predetermined short intervals. Accordingly, through execution of the present control routine, the duty ratios of the switching elements SW11, SW21, SW31, SW12, SW22, and SW32 of the motor drive circuit 50 are controlled by means of PWM control, whereby a steering assist torque corresponding to a steering operation of a driver is attained.

When the electric motor 15 is driven by means of such assist control, a large amount of current is withdrawn from the power supply apparatus 70. At that time, the power supply voltage, which is the output voltage of the power supply apparatus 70, drops temporarily. In particular, when the battery 71 deteriorates, not only does the power supply voltage drops, but its temporary voltage drop also increases. This drop in the power supply voltage results in a drop in the assist performance of the electric power steering apparatus 1. That is, the target current I* cannot be withdrawn from the power supply apparatus 70, and a predetermined steering assist torque cannot be obtained. Further, a drop in the power supply voltage also lowers the performances of the other vehicle electrical loads.

In order to overcome the above-described drawback, the electronic control apparatus 40 includes the power supply management section 42. This power supply management section 42 always monitors the power supply voltage, and restricts the use of electric power in the specific vehicle electrical loads 100 when necessary, to thereby lighten the load of the power supply apparatus 70. Hereinbelow, power use restriction processing executed by the power supply management section 42 will be described.

Figure 5:
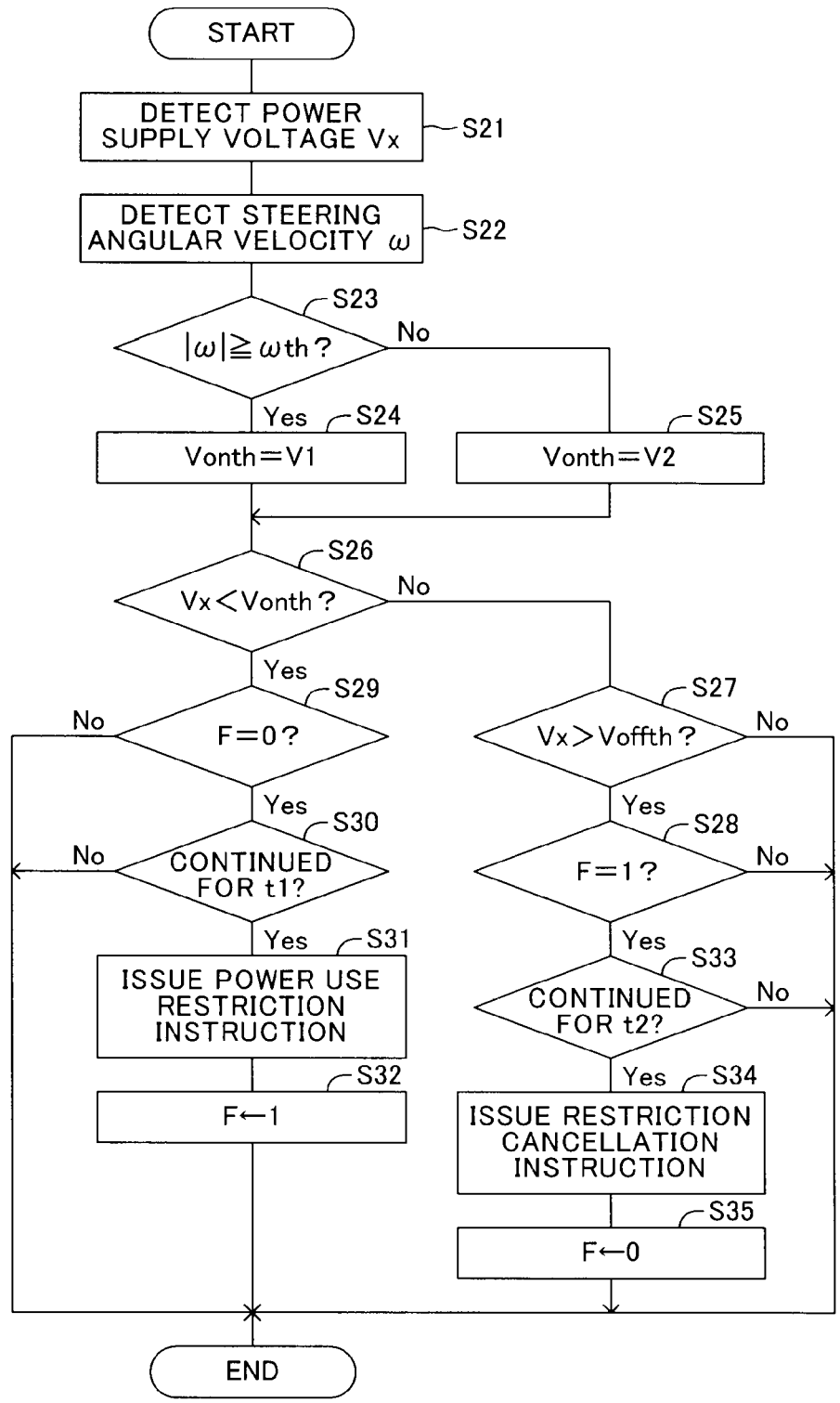
FIG. 5 is a flowchart showing a power-use-restriction control routine.

FIG. 5 shows a power-use-restriction control routine which is stored in the ROM of the electronic control apparatus 40 as a control program and executed by the power supply management section 42. The present control routine is repeatedly executed at short intervals in parallel with the above-described assist control routine.

When the present control routine is started, in step S21, the power supply management section 42 first detects the power supply voltage Vx. Specifically, the power supply management section 42 detects the primary side voltages of the diode 67 and the diode 68 shown in FIG. 2, and selects, as the power supply voltage Vx, the higher one of these voltages. Notably, in the present embodiment, the power supply voltage Vx supplied to the assist ECU 30 is used as the power supply voltage of the power supply apparatus 70. However, the present embodiment may be modified to directly detect the output voltage of the power supply apparatus 70.

Subsequently, in step S22, the power supply management section 42 detects the steering angular velocity ω. The motor control section 41 regularly calculates the steering angular velocity ω by differentiating, with respect to time, the steering angle θ of the steering wheel 11 detected from the output signal of the rotational angle sensor 17. Accordingly, the power supply management section 42 detects the steering angular velocity ω by reading data representing the steering angular velocity ω from the motor control section 41. Next, the power supply management section 42 proceeds to step S23, and determines whether or not the magnitude |ω| of the detected steering angular velocity ω is equal to or greater than a determination angular velocity ωth, which is a preset threshold.

The magnitude of the steering angular velocity ω and the amount of electric power used by the electric motor 15 correlate with each other, and the greater the steering angular velocity ω, the greater the amount of electric power used by the electric motor 15. Therefore, the power use state of the electric motor 15 can be estimated from the steering angular velocity ω. Accordingly, the processing of step S23 is adapted to determine, through estimation based on the steering angular velocity ω, whether or not the electric motor 15 uses a predetermined amount of electric power or more supplied from the power supply apparatus 70.

When the power supply management section 42 determines that the magnitude (|ω|) of the steering angular velocity ω is equal to or greater than the determination angular velocity ωth (S23: Yes), in step S24, the power supply management section 42 sets a restriction determination threshold Vonth to a first voltage value V1. When the power supply management section 42 determines that the magnitude (|ω|) of the steering angular velocity ω is less than the determination angular velocity ωth (S23: No), in step S25, the power supply management section 42 sets the restriction determination threshold Vonth to a second voltage value V2. This restriction determination threshold Vonth is a determination threshold associated with the power supply voltage Vx for determining whether or not power use restriction is to be imposed to the specific vehicle electrical loads 100.

The second voltage value V2 is set to a value higher than the first voltage value V1. In the present embodiment, for example, V1 is set to 9.0 V, and V2 is set to 10.5 V. The first voltage value V1 is a lowest power supply voltage which is measured when the motor is driven and which is required to attain a desired steering assist performance. Meanwhile, the second voltage value V2 is a voltage value obtained by adding to the first voltage value V1 an expected drop ΔV in the power supply voltage which occurs when the electric motor 15 is driven. That is, the second voltage value V2 is a lowest power supply voltage which is measured when the motor is not driven and which is required to attain the desired steering assist performance. In the present embodiment, it is assumed that, when the motor is driven, the power supply voltage of the power supply apparatus 70 decrease to 9.0 V as a result of a voltage drop ΔV of 1.5 V, and the second voltage value V2 is set to 10.5 V (=9.0 V+1.5 V).

The processing of the above-mentioned steps S22 to S25 is adapted to estimate from the magnitude of the steering angular velocity whether or not the electric motor 15 is driven such that it consumes at least a predetermined amount of electric power, set the restriction determination threshold Vonth to the first voltage value V1 when the electric motor 15 is estimated to be driven such that it consumes at least the predetermined amount of electric power (hereinafter simply referred to "when the electric motor 15 is driven"), and set the restriction determination threshold Vonth to the second voltage value V2 when the electric motor 15 is estimated not to be driven such that it consumes at least the predetermined amount of electric power (hereinafter simply referred to "when the electric motor 15 is not driven").

After setting the restriction determination threshold Vonth in step S24 or S25, the power supply management section 42 compares the restriction determination threshold Vonth and the power supply voltage Vx detected in step S21 so as to determine whether or not the power supply voltage Vx is lower than the restriction determination threshold Vonth (S26). When the power supply capacity of the power supply apparatus 70 is proper, the power supply voltage Vx is higher than the restriction determination threshold Vonth. Therefore, the power supply management section 42 makes a "No" determination in step S26. In this case, the power supply management section 42 proceeds to step S27.

In step S27, the power supply management section 42 determines whether or not the power supply voltage Vx is higher than a cancellation determination threshold Voffth. This cancellation determination threshold Voffth is a determination threshold associated with the power supply voltage Vx, which is used to cancel power use restriction if it is imposed on the specific vehicle electrical loads 100. In the present embodiment, the cancellation determination threshold Voffth is set to a value greater than the restriction determination threshold Vonth; for example, a value obtained by adding a predetermined value to the restriction determination threshold Vonth.

In a state where the power supply apparatus 70 outputs a proper voltage, the power supply management section 42 makes a "Yes" determination in step S27, and proceeds to step S28. In step S28, the power supply management section 42 determines whether or not the value of a flag F is "1." This flag F is set to "0" at the time the present control routine starts, and set to "1" when a power use restriction instruction is output to the specific vehicle electrical loads 100. Accordingly, in a situation where the power supply apparatus 70 has output a proper voltage from the start of the present control routine, the flag F has been set to "0." Therefore, the power supply management section 42 makes a "No" determination in step S28, and ends the current execution of the present control routine.

The present control routine is executed repeatedly at predetermined short intervals. When the power supply capacity of the power supply apparatus 70 has dropped and the power supply voltage Vx has first become lower than the restriction determination threshold Vonth (S26: Yes), the power supply management section 42 proceeds to step S29 so as to determine whether or not the value of the flag F is "0." In this case, the value of the flag F is "0" (initial value). Accordingly, the power supply management section 42 proceeds to step S30.

In step S30, the power supply management section 42 determines whether or not a state where the power supply voltage Vx is lower than the restriction determination threshold Vonth has continued for a restriction determination time t1 or more. This time measurement is performed by means of a software timer of the microcomputer. Until the state where the power supply voltage Vx is lower than the restriction determination threshold Vonth continues for the restriction determination time t1, the power supply management section 42 makes a "No" determination in step S30, and ends the current execution of the present routine. The above-described processing is repeated at the predetermined intervals.

When such processing is repeated and the state where the power supply voltage Vx is lower than the restriction determination threshold Vonth is determined to have continued for the restriction determination time t1 or more (S30: Yes), in step S31, the power supply management section 42 outputs a power use restriction instructions to the control apparatuses for the specific vehicle electrical loads 100. The specific vehicle electrical loads 100 stop their operations in response to the power use restriction instruction from the power supply management section 42. Alternatively, the specific vehicle electrical loads 100 reduce (for example, halve) their outputs. Accordingly, the load of the power supply apparatus 70 is reduced. Since the specific vehicle electrical loads 100 are vehicle electrical loads which do not directly affect the traveling of the vehicle, such as an air conditioning controller, a seat heater apparatus, and a defogger apparatus, safety is secured even when the specific vehicle electrical loads 100 stop their operations in response to the power use restriction instruction.

After having issued the power use restriction instruction to the control apparatuses of the specific vehicle electrical loads

100, the power supply management section 42 sets the flag F to "1" in step S32, and then ends the current execution of the present control routine.

Through repetition of such processing, the power supply management section 42 always monitors the power supply voltage Vx, and compares the power supply voltage Vx and the restriction determination threshold Vonth. The power supply management section 42 maintains that state so long as the power supply voltage Vx is lower than the restriction determination threshold Vonth (S26: Yes, S29: No). Accordingly, the specific vehicle electrical loads 100 are maintained in a state where their electric power uses are restricted.

When the power supply voltage Vx increases and returns to the restriction determination threshold Vonth in such a state, the power supply management section 42 makes a "No" determination in step S26, and proceeds to step S27. In step S27, the power supply management section 42 determines whether or not the power supply voltage Vx is higher than the cancellation determination threshold Voffth. In a case where the power supply voltage Vx has increased and exceeded the restriction determination threshold Vonth but is lower than the cancellation determination threshold Voffth, the power supply management section 42 makes a "No" determination, and ends the current execution of the present control routine.

Meanwhile, in a case where the power supply voltage Vx has increased and exceeded the cancellation determination threshold Voffth, the power supply management section 42 checks the flag F in step S28 (S28: Yes), and determines whether or not the sate where the power supply voltage Vx is higher than the cancellation determination threshold Voffth has continued for a cancellation determination time t2 or more (S33). This time measurement is performed by means of a software timer of the microcomputer. Unless the sate where the power supply voltage Vx is higher than the cancellation determination threshold Voffth has continued for the cancellation determination time t2, the power supply management section 42 makes a "No" determination in step S33, and ends the current execution of the present control routine. The above-described processing is repeated at predetermined intervals. The cancellation determination time t2 is set to be longer than the restriction determination time t1.

When such processing is repeated and the state where the power supply voltage Vx is higher than the cancellation determination threshold Voffth is determined to have continued for the cancellation determination time t2 or more (S33: Yes), in step S34, the power supply management section 42 issues a power use restriction cancellation instruction to the control apparatuses of the specific vehicle electrical loads 100. Accordingly, at this point in time, the power use restriction imposed on the specific vehicle electrical loads 100 is cancelled, whereby the specific vehicle electrical loads 100 return to the original operation states. After having issued the power use restriction cancellation instruction to the control apparatuses of the specific vehicle electrical loads 100, the power supply management section 42 sets the flag F to "0" in step S35, and ends the current execution of the present control routine.

In the above-described control routine, the power supply voltage Vx is always monitored, and the power supply voltage Vx and the restriction determination threshold Vonth are compared with each other. When the state where the power supply voltage Vx is lower than the restriction determination threshold Vonth has continued for the restriction determination time t1 or more, the power use restriction instruction is issued to the control apparatuses of the specific vehicle electrical loads 100 to thereby reduce the load of the power supply apparatus 70. In this case, the restriction determination threshold Vonth is set to one of two different values depending on whether or not the electric motor 15 is driven. That is, the value of the restriction determination threshold Vonth (=V2) used when the electric motor 15 is not driven is set to be higher than the value of the restriction determination threshold Vonth (=V1) used when the electric motor 15 is driven, by an amount corresponding to the voltage drop ΔV attributable to drive of the motor.

During periods in which power use restriction is imposed on the specific vehicle electrical loads 100, the power supply voltage Vx and the cancellation determination threshold Voffth are compared with each other, and when the state where the power supply voltage Vx is lower than the cancellation determination threshold Voffth has continued for the cancellation determination time t2 or more, the power use restriction cancellation instruction is issued to the control apparatuses of the specific vehicle electrical loads 100. Thus, the power use restriction imposed on the specific vehicle electrical loads 100 is cancelled, whereby the specific vehicle electrical loads 100 return to the original operation states.

The above-described electric power steering apparatus 1 of the present embodiment provides the following advantageous effects.

1. The value of the restriction determination threshold Vonth (=V2) used in the state where the electric motor 15 is not driven is set to be higher than the value of the restriction determination threshold Vonth (=V1) used in the state where the electric motor 15 is driven, in consideration of a voltage drop produced as a result of driving the motor. Therefore, even when a certain voltage drop is produced as a result of driving of the electric motor 15, it is possible to prevent occurrence of a phenomenon that the power supply voltage Vx drops, for the first time, below the restriction determination threshold Vonth at that time. That is, even in a state where electric motor 15 is not driven, when the capacity of the power supply apparatus 70 has lowered to such a level that the power supply apparatus 70 is estimated to fail to properly drive the electric motor 15, from that point in time, power use restriction can be imposed on the specific vehicle electrical loads 100. As a result, control delay at the time of start of drive control of the electric motor 15 can be suppressed.

2. Meanwhile, during periods in which the electric motor 15 is driven, the restriction determination threshold Vonth is set to a lower value as compared with that used in periods in which the electric motor 15 is not driven. This setting prevents excessive imposition of power use restriction on the specific vehicle electrical loads 100. That is, in the case where the restriction determination threshold Vonth is set to the fixed value, the determination threshold Vonth must be set to a rather high value in order to prevent control delay. However, such setting results in excessive imposition of power use restriction on the specific vehicle electrical loads 100. In contrast, in the present embodiment, during periods in which the electric motor 15 is driven, the restriction determination threshold Vonth is set to a lowest voltage required to maintain the assist control performance. Therefore, excessive power use restriction can be suppressed. This setting prevents the driver from being requested to replace the battery 71 at a frequency higher than necessary. Further, the specific vehicle electrical loads 100 can be used effectively.

3. Estimation for determining whether or not the electric motor 15 consumes a predetermined amount of electric power or more is performed on the basis of the steering angular velocity ω calculated from the detection signal output from the rotational angle sensor 17. Therefore, a special structural element is not required to obtain the power consumption of the electric motor 15, so that cost does not increase. Further, detecting the power use state of the electric motor 15 from the steering angular velocity ω is advantageous in that, when the steering wheel 11 is located at a counterclockwise or clockwise limit steering angle (the so-called "end position"), the power consumption of the electric motor 15 is not overestimated. That is, in a state where the steering wheel 11 is maintained at the end position, only a small amount of current flows through the electric motor 15, and the steering angular velocity ω is zero. Therefore, even when the driver maintains the steering wheel 11 at the end position with a strong force, the power consumption of the electric motor 15 is not overestimated.

4. The cancellation determination threshold Voffth, which is a determination condition for cancelling power use restriction, is set to a value higher than the restriction determination threshold Vonth. This setting prevents occurrence of hunting; i.e., frequent switching between the state where power use restriction is imposed and the state where power use restriction is not imposed, which hunting would otherwise occur as a result of the power supply voltage Vx frequently changing across the restriction determination threshold Vonth. Therefore, stable power use restriction control can be performed. Moreover, since the operation states of the specific vehicle electrical loads 100 are not switched at an excessive frequency, the specific vehicle electrical loads 100 can be protected.

5. The power use restriction instruction or the power use restriction cancellation instruction is issued after confirming that the condition for issuing the instruction has been continuously satisfied over the restriction determination time or the cancellation determination time. Accordingly, for an instantaneous change in the power supply voltage, the state of power use restriction is not switched, whereby stable power restriction control can be performed. In addition, the cancellation determination time t2, which is the condition associated with continuity so as to cancel power use restriction, is set to be longer than the restriction determination time t1, which is the condition associated with continuity so as to start power use restriction. Therefore, stability and responsiveness of power restriction control can be realized simultaneously. That is, the determination for starting power use restriction is performed within a short period of time so as to enhance responsiveness; and the determination for cancelling power use restriction is performed while using a longer time so as to enhance stability, because the determination for cancelling power use restriction does not require high responsiveness.

In the above, the electric power steering apparatus 1 of the present embodiment has been described. However, the present invention is not limited to the above-described embodiments, and may be modified in various manners without departing from the scope of the present invention.

Figure 6:
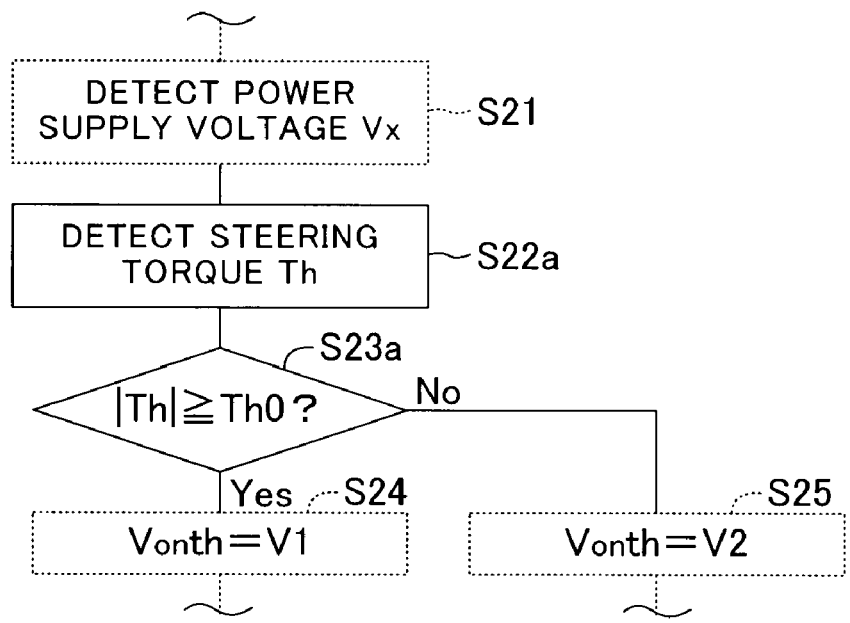
FIG. 6 is a partial modification of the power-use-restriction control routine.

For example, in the above-described embodiment, the state of use of electric power by the electric motor 15 is estimated from the steering angular velocity ω. However, instead, the state of use of electric power by the electric motor 15 may be estimated from the steering torque Th detected by the steering torque sensor 21 (steering torque detection means). In this case, when the magnitude |Th| of the steering torque Th is equal to or greater than a predetermined determination torque Th0, the electric motor 15 is estimated to use a predetermined amount of electric power or more. That is, step S22 and S23 of FIG. 5 are replaced with step S22a and S23a of FIG. 6. When the magnitude |Th| of the steering torque Th is equal to or greater than the predetermined determination torque Th0, the first voltage value V1 is used as the restriction determination threshold Vonth; and, when the magnitude |Th| of the steering torque Th is less than the predetermined determination torque Th0, the second voltage value V2 (>V1) is used as the restriction determination threshold Vonth. Notably, the steering torque Th is detected by making use of data used in the motor control section 41.

Figure 7:
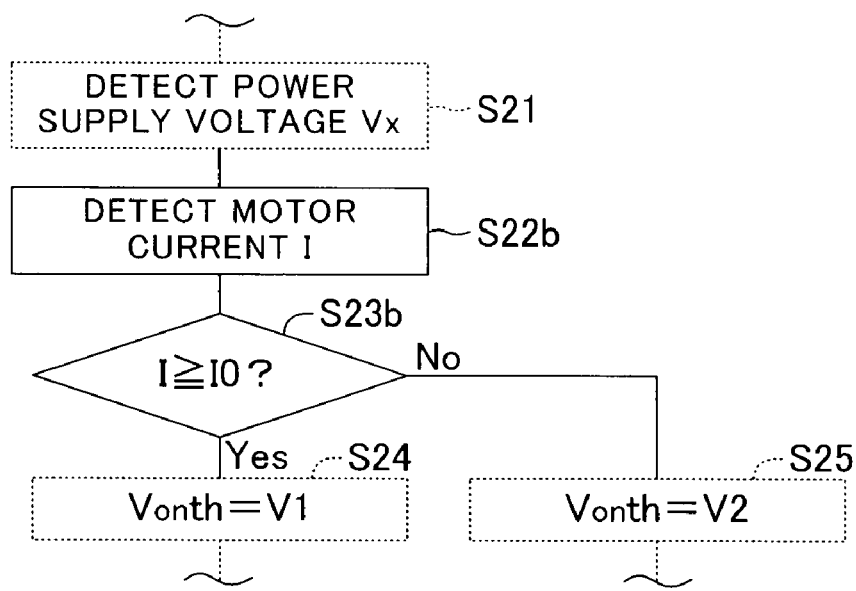
FIG. 7 is a partial modification of the power-use-restriction control routine.
Figure 8:
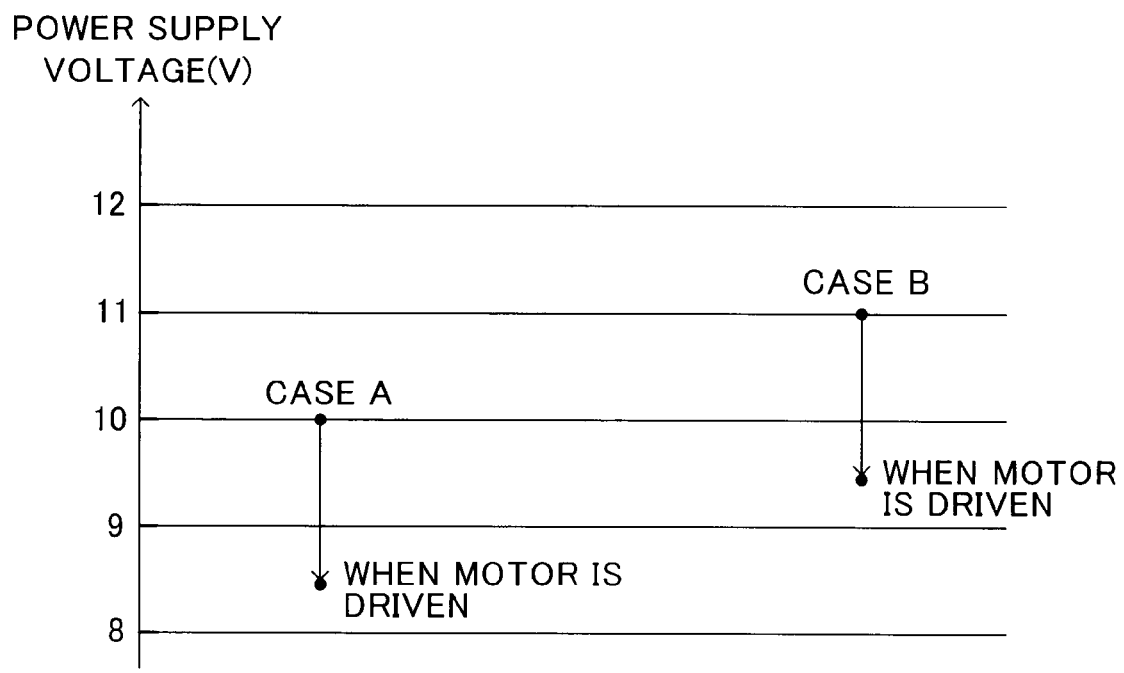
FIG. 8 is an explanatory diagram showing changes in power supply voltage.

Further, the state of use of electric power by the electric motor 15 may be estimated from the current I flowing through the electric motor 15. The current I flowing through the electric motor 15 may be the actual current Ix detected by the current sensor 53, or the target current I*. In this case, when the motor current I is equal to or greater than a predetermined determination current I0, the electric motor 15 is estimated to use a predetermined amount of electric power or more. That is, step S22 and S23 of FIG. 5 are replaced with step S22b and S23b of FIG. 7. When the motor current I is equal to or greater than the predetermined determination current I0, the first voltage value V1 is used as the restriction determination threshold Vonth; and, when the motor current I is less than the predetermined determination current I0, the second voltage value V2 (>V1) is used as the restriction determination threshold Vonth. Notably, the motor current I is detected by making use of data used in the motor control section 41.

Further, when power use restriction is imposed on the specific vehicle electrical loads 100, the degree of restriction may be variable. That is, the power supply management section 42, which serves as restriction instruction means, may output a restriction instruction while specifying the degree of power use restriction to be imposed on the specific vehicle electrical loads 100. For example, the power supply management section 42 outputs the restriction instruction such that the greater the deviation (Vonth−Vx) between the detected power supply voltage Vx and the restriction determination threshold Vonth, the greater the degree of power use restriction imposed on the specific vehicle electrical loads 100. In this case, the power supply management section 42 may output a restriction instruction to the specific vehicle electrical loads 100 while specifying a restriction ratio. For example, when the restriction ratio is 100%, operations of the specific vehicle electrical loads 100 are prohibited; and, when the restriction ratio is 70%, the specific vehicle electrical loads 100 are driven such that the specific vehicle electrical loads 100 consume an electric power which is 30% (permitted ratio=100%−70% (the restriction ration)) the electric power consumed in the ordinary state. Further, as the degree of restriction, an upper limit electric power which the specific vehicle electrical loads 100 can use may be instructed. In this case, the relation between the deviation (Vonth−Vx) and the degree of restriction is advantageously stored in storage means in the form of, for example, a map or a function.

Further, in the present embodiment, the power supply management section 42, which issues a power use restriction instruction directly to the specific vehicle electrical loads 100, is provided in the assist ECU 30 of the electric power steering apparatus 1. However, in a case where a power supply management system which totally controls the state of use of electric power by the vehicle electrical loads is configured separately from the electric power steering apparatus 1, the assist ECU 30 may be configured to output a power use restriction instruction and a power use restriction cancellation instruction to the power supply management system.

Further, in the present embodiment, when power use restriction is cancelled, a cancellation instruction is output to the specific vehicle electrical loads 100. However, the embodiment may be modified to stop the power use restriction instruction. That is, during periods in which power use restriction is imposed, a power use restriction instruction is continuously output; and, when the condition for cancelling the power use restriction is satisfied, this power use restriction instruction is stopped.

Further, in the present embodiment, an electric power steering apparatus for assisting operation of the steering wheel has been described. However, the present invention can be applied to a steering-by-wire-type steering apparatus in which the steering wheel and the steerable wheels are mechanically separated from each other. That is, a steering-by-wire-type steering apparatus may include at least one of an electric motor which generates a steering reaction torque in accordance with a driver's steering wheel operation and an electric motor which generates a steering torque for steering the steerable wheels, and be configured to switch the restriction determination threshold in accordance with the state of use of electric power by the at least one motor.

The invention claimed is:

1. A steering apparatus comprising:
   an electric motor to which electric power is supplied from a power supply apparatus and which generates a steering torque;
   motor control means for controlling an amount of electricity supplied to the electric motor in accordance with an operation state of a steering wheel;
   voltage detection means for detecting a power supply voltage of the power supply apparatus;
   restriction instruction means for determining whether or not the voltage detected by the voltage detection means is lower than a restriction determination threshold and for issuing a restriction instruction, when the detected voltage is lower than the restriction determination threshold, so as to restrict use of electric power by a specific vehicle electrical load which receives electric power from the power supply apparatus; and
   determination threshold switching means for switching the restriction determination threshold in accordance with a state of use of electric power by the electric motor in such a manner that a value of the restriction determination threshold used when the electric motor is determined not to use a predetermined amount of electric power or more is set to be higher than a value of the restriction determination threshold used when the electric motor is determined to use the predetermined amount of electric power or more.

2. A steering apparatus according to claim 1, further comprising
   steering angular velocity detection means for detecting a steering angular velocity of the steering wheel, wherein
   the determination threshold switching means estimates the state of use of electric power by the electric motor on the basis of the detected steering angular velocity, and switches the restriction determination threshold in such a manner that a value of the restriction determination threshold used when the steering angular velocity is less than a predetermined angular velocity is set to be higher than a value of the restriction determination threshold used when the steering angular velocity is equal to or greater than the predetermined angular velocity.

3. A steering apparatus according to claim 1, further comprising
   steering torque detection means for detecting a steering torque applied to the steering wheel, wherein
   the determination threshold switching means estimates the state of use of electric power by the electric motor on the basis of the detected steering torque, and switches the restriction determination threshold in such a manner that a value of the restriction determination threshold used when the steering torque is less than a predetermined torque is set to be higher than a value of the restriction determination threshold used when the steering torque is equal to or greater than the predetermined torque.

4. A steering apparatus according to claim 1, further comprising
   motor current detection means for detecting a current flowing through the electric motor, wherein
   the determination threshold switching means estimates the state of use of electric power by the electric motor on the basis of the detected motor current, and switches the restriction determination threshold in such a manner that a value of the restriction determination threshold used when the motor current is less than a predetermined current is set to be higher than a value of the restriction determination threshold used when the motor current is equal to or greater than the predetermined current.

5. A steering apparatus according to claim 1, further comprising
   restriction cancellation means for canceling the restriction on power use when the power supply voltage detected by the voltage detection means becomes higher than a pre-set cancellation determination threshold in a state where the restriction instruction means is outputting the restriction instruction, wherein the cancellation determination threshold is higher than the restriction determination threshold.

6. A steering apparatus according to claim 5, wherein
   the restriction instruction means outputs the restriction instruction when a state in which the voltage detected by the voltage detection means is lower than the restriction determination threshold continues for a restriction determination time or more;
   the restriction cancellation means cancels the restriction on use of electric power when a state in which the power supply voltage detected by the voltage detection means is higher than the cancellation determination threshold continues for a cancellation determination time or more, and
   the cancellation determination time is longer than the restriction determination time.

7. A steering apparatus comprising:
   an electric motor to which electric power is supplied from a power supply apparatus and which generates a steering torque;
   a motor control device that controls an amount of electricity supplied to the electric motor in accordance with an operation state of a steering wheel;
   a voltage detection device that detects a power supply voltage of the power supply apparatus;
   a restriction instruction device that determines whether or not the voltage detected by the voltage detection device is lower than a restriction determination threshold and for issuing a restriction instruction, when the detected voltage is lower than the restriction determination threshold, so as to restrict use of electric power by a specific vehicle electrical load which receives electric power from the power supply apparatus; and
   a determination threshold switching device that switches the restriction determination threshold in accordance with a state of use of electric power by the electric motor in such a manner that a value of the restriction determination threshold used when the electric motor is determined not to use a predetermined amount of electric power or more is set to be higher than a value of the restriction determination threshold used when the electric motor is determined to use the predetermined amount of electric power or more.

* * * * *